United States Patent
Cheng et al.

(10) Patent No.: US 10,218,419 B2
(45) Date of Patent: *Feb. 26, 2019

(54) SYSTEM AND METHOD FOR CODING WCDMA MIMO CQI REPORTS

(71) Applicant: TELEFONAKTIEBOLAGET L M ERICSSON (PUBL), Stockholm (SE)

(72) Inventors: Jung-Fu Cheng, Cary, NC (US); Yi-Pin Eric Wang, Cary, NC (US); Stephen Grant, Cary, NC (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1048 days.

This patent is subject to a terminal disclaimer.

(21) Appl. No.: 13/927,975

(22) Filed: Jun. 26, 2013

(65) Prior Publication Data

US 2014/0126663 A1 May 8, 2014

Related U.S. Application Data

(63) Continuation of application No. 11/862,601, filed on Sep. 27, 2007, now Pat. No. 8,619,742.

(60) Provisional application No. 60/863,688, filed on Oct. 31, 2006.

(51) Int. Cl.
| | |
|---|---|
| H04B 7/0456 | (2017.01) |
| H04B 1/707 | (2011.01) |
| H04L 1/00 | (2006.01) |
| H04L 1/06 | (2006.01) |
| H04L 25/02 | (2006.01) |

(52) U.S. Cl.
CPC ........... *H04B 7/0473* (2013.01); *H04B 1/707* (2013.01); *H04L 1/0026* (2013.01); *H04L 1/0031* (2013.01); *H04L 1/0057* (2013.01); *H04L 1/0073* (2013.01); *H04L 1/06* (2013.01); *H04L 25/0202* (2013.01)

(58) Field of Classification Search
CPC ..... H04B 1/707; H04B 7/0473; H04L 1/0026; H04L 1/0031; H04L 1/0057; H04L 1/0073; H04L 1/06; H04L 25/0202
USPC .................................................. 370/208–356
See application file for complete search history.

(56) References Cited

U.S. PATENT DOCUMENTS

| | | | |
|---|---|---|---|
| 3,353,155 | A | 11/1967 | Chien et al. |
| 5,150,381 | A | 9/1992 | Forney et al. |
| 5,761,239 | A * | 6/1998 | Gold et al. ................ 375/150 |
| 5,890,151 | A | 3/1999 | Agrawal et al. |
| 5,996,104 | A | 11/1999 | Herzberg |
| 6,038,315 | A | 3/2000 | Strait et al. |

(Continued)

OTHER PUBLICATIONS

Kenneth et al., Construction of Binary Linear Codes, 2000, Department of Mathematics, Natinal University of Singapore, pp. 1-53.*

(Continued)

*Primary Examiner* — Nicholas Sloms

(57) ABSTRACT

A block coding method and system for improving the reliability of Channel Quality Indicators (CQI) and antenna weight indicators (AWI) reporting. A user terminal first generates 8-bit CQI and 2-bit AWI. A codeword generator produces a codeword responsive to these 10 CQI/AWI bits using a codebook or a generator matrix of a (20,10,6) code. The (20,10,6) code has a minimum Hamming distance of 6 The encoded codeword is transmitted to a receiver for decoding utilizing an identical (20,10,6) codebook.

23 Claims, 5 Drawing Sheets

(56) References Cited

U.S. PATENT DOCUMENTS

| | | | |
|---|---|---|---|
| 6,307,892 B1 | 10/2001 | Jones et al. | |
| 6,473,878 B1 | 10/2002 | Wei | |
| 6,961,387 B2 | 11/2005 | Kim et al. | |
| 7,200,795 B2 | 4/2007 | Stek et al. | |
| 7,308,402 B2 | 12/2007 | Zhou et al. | |
| 7,319,718 B2* | 1/2008 | Roh et al. | 375/224 |
| 7,428,269 B2 | 9/2008 | Sampath et al. | |
| 7,492,752 B2 | 2/2009 | Harris et al. | |
| 7,499,474 B2 | 3/2009 | Derryberry et al. | |
| 7,508,751 B2* | 3/2009 | Byun et al. | 370/210 |
| 7,549,110 B2 | 6/2009 | Stek et al. | |
| 7,590,045 B2 | 9/2009 | Oh et al. | |
| 7,624,327 B2 | 11/2009 | French | |
| 7,653,197 B2 | 1/2010 | Van Dijk | |
| 7,684,762 B2 | 3/2010 | Ihm et al. | |
| 7,720,164 B2 | 5/2010 | Ramesh et al. | |
| 7,724,722 B2 | 5/2010 | Seo et al. | |
| 7,729,234 B2 | 6/2010 | Byun et al. | |
| 7,773,557 B2 | 8/2010 | Grant et al. | |
| 7,788,570 B1 | 8/2010 | Feng | |
| 8,005,154 B2 | 8/2011 | Kwon et al. | |
| 8,078,932 B2 | 12/2011 | Zeira et al. | |
| 8,619,742 B2* | 12/2013 | Cheng et al. | 370/342 |
| 2002/0114268 A1 | 8/2002 | Kim et al. | |
| 2005/0034047 A1 | 2/2005 | Stek et al. | |
| 2005/0195889 A1* | 9/2005 | Grant | H04B 1/707 375/148 |
| 2005/0232138 A1 | 10/2005 | Byun et al. | |
| 2005/0265227 A1 | 12/2005 | Byun et al. | |
| 2006/0013185 A1 | 1/2006 | Seo et al. | |
| 2006/0105709 A1 | 5/2006 | Oh et al. | |
| 2006/0109923 A1* | 5/2006 | Cai et al. | 375/260 |
| 2006/0176803 A1 | 8/2006 | Oh et al. | |
| 2006/0268788 A1 | 11/2006 | Harris et al. | |
| 2007/0162830 A1 | 7/2007 | Stek et al. | |
| 2007/0234176 A1 | 10/2007 | French | |
| 2007/0286124 A1 | 12/2007 | Grant et al. | |
| 2008/0016431 A1 | 1/2008 | Lablans | |
| 2008/0037669 A1 | 2/2008 | Pan et al. | |
| 2008/0043867 A1 | 2/2008 | Blanz et al. | |
| 2008/0044027 A1 | 2/2008 | Van Dijk | |
| 2008/0080431 A1* | 4/2008 | Zeira | H04L 1/0057 370/333 |
| 2008/0101321 A1 | 5/2008 | Cheng et al. | |
| 2008/0165872 A1 | 7/2008 | Kwon et al. | |
| 2008/0205451 A1 | 8/2008 | Ramesh et al. | |
| 2008/0294967 A1 | 11/2008 | Tomlinson et al. | |
| 2009/0215401 A1 | 8/2009 | Yoon et al. | |
| 2009/0217139 A1 | 8/2009 | Roh et al. | |
| 2009/0228759 A1 | 9/2009 | Stek et al. | |
| 2009/0292972 A1 | 11/2009 | Seol et al. | |
| 2010/0169741 A1 | 7/2010 | Laurent et al. | |
| 2010/0287453 A1 | 11/2010 | Balachandran et al. | |
| 2011/0122846 A1 | 5/2011 | Yu et al. | |
| 2011/0128917 A1 | 6/2011 | Ko et al. | |
| 2012/0044894 A1 | 2/2012 | Ko et al. | |
| 2012/0250542 A1 | 10/2012 | Zeira et al. | |
| 2013/0034066 A1 | 2/2013 | Kakishima et al. | |

OTHER PUBLICATIONS

HS-DPCCH in Support of D-TxAA, Sep. 1, 2006, 3GPP TSG-RAN WG1 #46, R1-062031, pp. 1-13.*

Fekri, F. et al. Decoding of Half-Rate Wavelet Coes; Folay Code and More. Acoustics, Speech, and Signal Processing, 2001. Proceedings. (ICASSP '01). 2001 IEEE International Conference, vol. 4, no.. pp. 2609-2612 vol. 4. Dec. 31, 2001.

QUALCOMM Europe: "HS-DPCCH in support of D-TxAA", R1-062031, 3GPP TSG-RAN WG1 #46, Tallinn, Eatonia, Aug. 28-Sep. 1, 2006, p. 11, line 4-line 12, table 5.

QUALCOMM Europe: "Open issues on details in support of MIMO (FDD) for Rel-7," R1-062440, 3GPP TSG-RAN WG1 #46, Tallinn, Estonia, Aug. 28-Sep. 1, 2006, section 1.3, third bullet.

QUALCOMM Europe: "L1 uplink control information in support of MIMO," 3GPP Draft; R1-062676, 3GPP TSG-RAN WG1 #46bis, Seoul, Korea, Oct. 9-13, 2006.

* cited by examiner

SYSTEM AND METHOD FOR CODING WCDMA MIMO CQI REPORTS

CROSS-REFERENCE TO RELATED APPLICATIONS

This application is a continuation of U.S. application Ser. No. 11/862,601, which claims the benefit of U.S. Provisional Application No. 60/863,688, filed Oct. 31, 2006, the disclosures of which are incorporated herein by reference.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND OF THE INVENTION

The present invention relates to Wideband Code Division Multiple Access (WCDMA) technology. More particularly, and not by way of limitation, the present invention is directed to a system and method for improving the reliability for the transmission of Multiple-Input-Multiple-Output (MIMO) channel quality indicators (CQI) and antenna weight indicators (AWI).

With the introduction of Multiple-input-multiple-output (MIMO) transmission technology to increase spectral efficiency and system throughput of WCDMA systems, more detailed reporting of channel quality indicators (CQI) in support of MIMO transmission is needed. For example, for 2 by 2 MIMO, 2 CQI numbers, each for a data stream, are needed. According to W-CDMA Release 7, each of these CQI numbers is represented by 4 bits, and thus overall 8 bits are used for CQI feedback. In addition, a user terminal (UE) needs to feed back a 2-bit antenna weight indicator (AWI). Thus the total UE feedback is 10 bits.

In Release 6 of WCDMA systems (3GGPP TX 25.212, v.6, "Multiplexing and Channel Coding (FDD) (Release 6)"), 32 different types of CQI messages can be represented by 5 information bits. With a spreading factor of 256, these information bits can be encoded into 20 channel coded bits in 2 slots. Such a channel is built upon the first order Reed-Muller code. The minimum distance of the Release-6 CQI code has minimum Hamming distance 8. In the below discussion, (n,k,d) is used to refer to a class of block codes that encodes k information bits to produce a codeword of n-bits long and has a Hamming distance between any pair of distinct codewords no less than d. Thus, the Release 6 code for CQI is a (20,5,8) code. Sometimes, the notation (n,k) is used to describe the length of the codeword and the input information block.

As mentioned earlier, 10 CQI/AWI feedback bits are needed to support 2 by 2 MIMO operations. Providing channel coding protection for the lengthened feedback message is proposed in "Definition of HS-DPCCH coding for FDD MIMO operation in Rel-7" 3GPP TSG RAN1 Tdoc R1-063422, Meeting #47bis, November 2006; based on a (20,10) code shortening of the $2^{nd}$ order Reed-Muller. The generator matrix of this code is $$G_{20,10,4} = \quad (1)$$

$$\begin{bmatrix} 1 & 0 & 1 & 0 & 1 & 0 & 1 & 0 & 1 & 0 & 1 & 0 & 1 & 0 & 0 & 0 & 0 & 0 \\ 0 & 1 & 1 & 0 & 0 & 1 & 1 & 0 & 0 & 1 & 1 & 0 & 0 & 1 & 1 & 0 & 0 & 0 & 0 & 0 \\ 0 & 0 & 0 & 1 & 1 & 1 & 1 & 0 & 0 & 0 & 0 & 1 & 1 & 1 & 1 & 0 & 0 & 0 & 0 & 0 \\ 0 & 0 & 0 & 0 & 0 & 0 & 0 & 1 & 1 & 1 & 1 & 1 & 1 & 1 & 1 & 0 & 0 & 0 & 0 & 0 \\ 1 & 1 & 1 & 1 & 1 & 1 & 1 & 1 & 1 & 1 & 1 & 1 & 1 & 1 & 1 & 1 & 1 & 1 & 1 & 1 \\ 0 & 0 & 1 & 0 & 0 & 0 & 1 & 0 & 0 & 0 & 1 & 0 & 0 & 0 & 1 & 0 & 0 & 0 & 0 & 0 \\ 0 & 0 & 0 & 0 & 1 & 0 & 1 & 0 & 0 & 0 & 0 & 1 & 0 & 1 & 0 & 0 & 0 & 0 & 0 & 0 \\ 0 & 0 & 0 & 0 & 0 & 0 & 0 & 1 & 0 & 1 & 0 & 1 & 0 & 1 & 0 & 0 & 0 & 0 & 0 & 0 \\ 0 & 0 & 0 & 0 & 0 & 1 & 1 & 0 & 0 & 0 & 0 & 0 & 1 & 1 & 0 & 0 & 0 & 0 & 0 & 0 \\ 0 & 0 & 0 & 0 & 0 & 0 & 0 & 0 & 1 & 1 & 0 & 0 & 1 & 1 & 0 & 0 & 0 & 0 & 0 & 0 \end{bmatrix}$$

For any linear block code, one can calculate its distance spectrum by finding the distance distribution of all the codewords to the all-zero codeword (zero in all the positions). For example, the distance spectrum of the above code is given by 0 1
4 57
6 120
8 262
10 144
12 262
14 120
16 57
20 1.

This means that among all the codewords, there is one codeword (the all-zero codeword itself, [0 0 0 0 0 0 0 0 0 0 0 0 0 0 0 0 0 0 0 0]) having zero Hamming distance from the all-zero codeword, there are 57 codewords having Hamming distance 4 from the all-zero codeword, there are 120 codewords having Hamming distance 6 from the all-zero codeword, there are 262 codewords having Hamming distance 8 from the all-zero codeword, there are 144 codewords having Hamming distance 10 from the all-zero codeword, there are 262 codewords having Hamming distance 12 from the all-zero codeword, there are 120 codewords having Hamming distance 14 from the all-zero codeword, there are 57 code-words having Hamming distance 16 from the all-zero codeword, and there is 1 codeword having Hamming distance 20 from the all-zero codeword. Thus, the minimum Hamming distance between any distinct codewords in the above code is 4, making this a (20,10,4) code.

In general, there are numerous codebooks of (n,k,d) code having the same distance spectrum. For example, any permutation (shuffling the transmission order) on a (n,k,d) code results in another (n,k,d) code having the same distance spectrum. Also, any common masking m applied to all the codewords of a (n,k,d) code results in another (n,k,d) code having the same distance spectrum. We will use a simple example below to illustrate this. Consider a simple generator matrix $$G = [1 \quad 1 \quad 0 \quad 0 \quad 0 \quad 0 \quad 1 \quad 1];$$

The four codewords generated by this generator matrix are $$\begin{matrix} 0 & 0 & 0 & 0 \\ 1 & 1 & 0 & 0 \\ 0 & 0 & 1 & 1 \\ 1 & 1 & 1 & 1. \end{matrix}$$

The distance spectrum of this codeword is
0 1
2 2
4 1.
Thus, one codeword at Hamming distance 0 away from the all-zero codeword, two codewords at Hamming distance 2 away from the all-zero codeword, and one codeword at Hamming distance 4 away from the all-zero codeword. Now, changing the order of the $2^{nd}$ and $3^{rd}$ encoded bit in the above code, the four new codewords are $$\begin{matrix} 0 & 0 & 0 & 0 \\ 1 & 0 & 1 & 0 \\ 0 & 1 & 0 & 1 \\ 1 & 1 & 1 & 1. \end{matrix}$$

It is easy to see that the distance spectrum remains the same. Now further perform masking on the above code using a common mask of [1 1 1 0], we have
0 0 0 0+1 1 1 0=1 1 1 0
1 0 1 0+1 1 1 0=0 1 0 0
0 1 0 1+1 1 1 0=1 0 1 1
1 1 1 1+1 1 1 0=0 0 0 1.
It is easy to see that the new code preserves a distance spectrum of
0 1
2 2
4 1.
The minimum Hamming distance of the above proposed (20,10) code is only 4. This minimum distance implies a significantly weaker protection for CQI information bits compared to the existing code in Release 6 for CQI protection. A comparison of the Rel6 CQI channel code and the above proposed code based on the generator matrix $G_{20,10,4}$ shown above is provided in the graph shown in FIG. 4 (comparing Rel6 channel code (20,5,8) and a (20,10,4) code for MIMO CQI). It can be seen that, with the above proposed code, one more dB is required to carry each of the CQI information bits. At the same time, the number of information bits to carry has doubled. In summary, significantly more power is needed to transmit the detailed MIMO CQI report reliably.

It would be advantageous to have a system and method for providing CQI and AWI information to a base station that overcomes the disadvantages of the prior art. The present invention provides such a system and method.

BRIEF SUMMARY OF THE INVENTION

It is an object of the invention to provide more detailed reporting of Channel Quality Indicators in support of Multiple-input-multiple-output transmission in a WCDMA system. A channel code that utilizes less power per information bit to carry the CQI bits is provided.

A user equipment generates CQI bits and antenna weight indicator (AWI) bits for transfer to an encoder in the user equipment. The encoder utilizes a (20,10,6) codebook, or a generator matrix, stored in the UE to produce a codeword according to a ten bit sequence comprising the CQI bits and the AWI bits. The (20,10,6) codeword is then transmitted to a base station in the WCDMA system.

The WCDMA system receives the codeword at a base station that processes the signal containing the (20,10,6) codeword in order to produce twenty soft values. Each of the soft values corresponds to a bit in the (20,10,6) codeword. The (20,10,6) codeword is decoded and the CQI bits are passed to a rate controller with the AWI bits going to an antenna weight controller.

The (20,10,6) code has a distance spectrum comprising, measured from the all-zero or any codeword: one codeword having zero Hamming distance; 40 codewords having Hamming distance 6; 160 codewords having Hamming distance 7; 130 codewords having Hamming distance 8; 176 codewords having Hamming distance 10; 320 codewords having Hamming distance 11; 120 codewords having Hamming distance 12; 40 codewords having Hamming distance 14; 32 codewords having Hamming distance 15; and 1 codeword having Hamming distance 16.

Thus, for the purpose of the present invention, the numerous forms of the (n,k,d) code are all covered as long as they have the same distance spectrum

BRIEF DESCRIPTION OF THE SEVERAL VIEWS OF THE DRAWING

In the following section, the accompanying figures where like reference numerals refer to identical or functionally similar elements and which together with the detailed description below are incorporated in and form part of the specification, serve to further illustrate exemplary embodiments illustrated in the figures, in which.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1A:
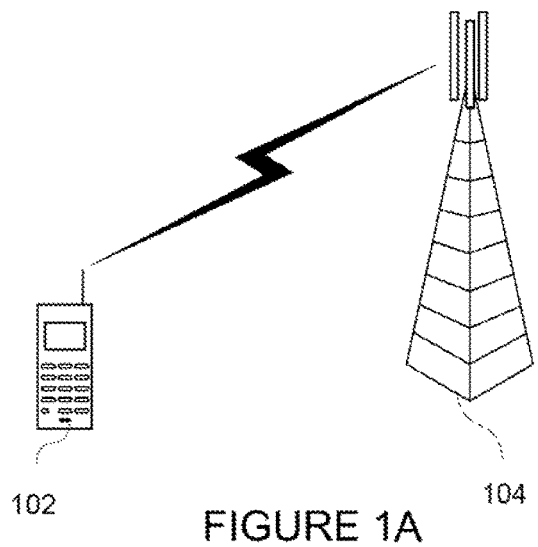
FIG. 1a depicts a high-level block diagram of a user equipment (UE) in communication with a base station according to a preferred embodiment of the present invention.

FIG. 1a depicts a high-level block diagram of a user equipment (UE) in communication with a base station according to a preferred embodiment of the present invention. UE 102 is depicted as being serviced by base station 104 in a WCDMA system, and base station 104 receives reports of Channel Quality Indicator and Antenna Weight indicator from the UE.

Figure 1B:
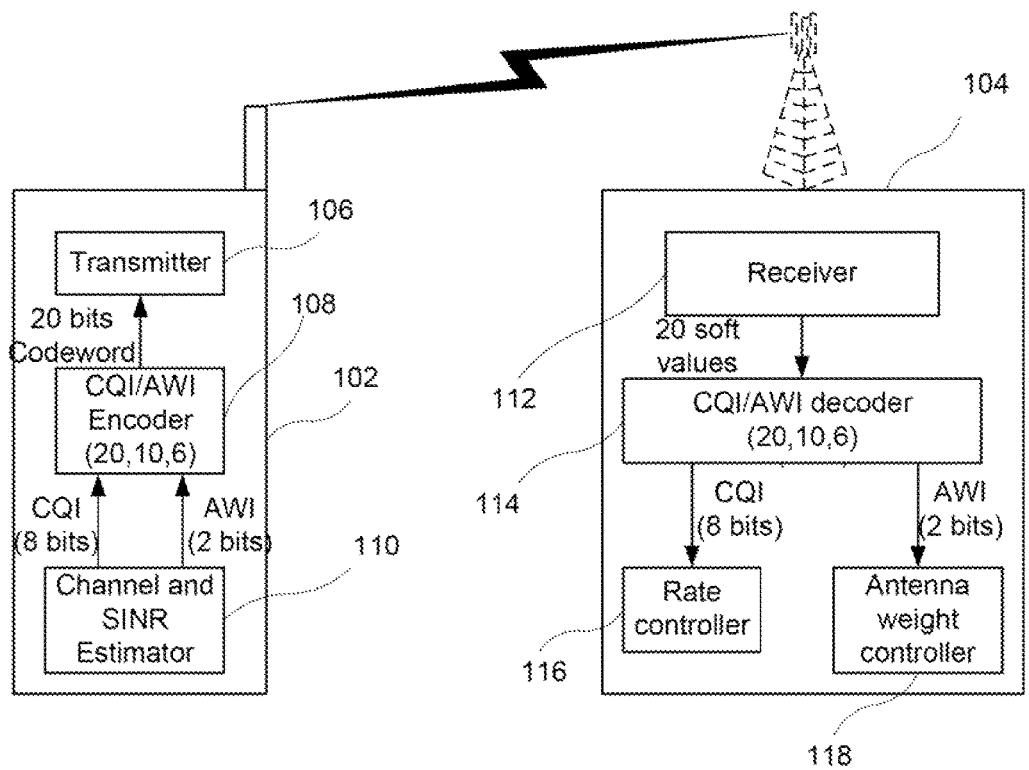
FIG. 1b illustrates a multiple-input-multiple-output user equipment (MIMO UE) in communication with a base station in accordance with a preferred embodiment of the present invention.

FIG. 1b illustrates, in greater detail, a Multiple-Input-Multiple-Output user equipment (MIMO UE) in communication with a base station in accordance with a preferred embodiment of the present invention. MIMO UE 102, reports to serving Node B 104 (also termed base station) channel quality indicator (CQI) and preferred antenna weight indicator (AWI), also termed PCI (precoder indicator). There are 8 bits CQI and 2 bits AWI to be sent. Typically, the UE employs channel and signal-interference-plus-noise ratio (SINR) estimator 110 to generate the CQI and AWI bits. The 10-bit CQI/AWI sequence is given to CQI/AWI encoder 108. CQI/AWI 108 encoder uses a (20, 10,6) codebook to produce a 20-bit codeword according to the input 10-bit sequence. The codebook consists of 1024 codewords each associated with a 10-bit sequence. Since there are 1024 combinations of the 10-bit input sequence, there are 1024 codewords.

The codebook has a property that any two distinct codewords differ by at least 6 bits; i.e., the codebook has a minimum Hamming distance of 6. A large minimum Hamming distance implies better performance of the code. For example with a minimum Hamming distance of 6, the receiver can correct 2 erroneous bits in a received codeword when hard-decision decoding is used. In comparison, with a minimum Hamming distance of 4, the receiver can only correct 1 erroneous bit in the codeword. The codeword generated by CQI/AWI encoder 108 is given to transmitter 106 to perform spreading, scrambling, and other RF transmission processing.

The transmitted codeword is received by Node B 104 which is serving UE 102. The received codeword is RF down converted, filtered, descrambled, and de-spread by receiver 112 to produce 20 soft values, each soft value corresponding to a bit in the received codeword. Each soft value may be further quantized to two levels e.g., negative values quantized to $-A$ and positive values quantized to A. These soft values are given to (20,10,6) CQI/AWI decoder 114 to recover the transmitted 10 CQI/AWI information bits. CQI/AWI decoder 114 also includes the same codebook that is used by the CQI/AWI encoder 108 in UE 102. That is, the codebook used in CQI/AWI decoder 114 also has a property that any two distinct codewords differ by at least 6 bits.

As noted above, a (20,10) code with an optimal minimum Hamming distance of 6 would offer better protection of the CQI/AWI feedback report. The description below illustrates a non-limiting exemplary method for producing a (20,10,6) code. In order to provide a minimum Hamming distance of 6, as a first step, a quadratic residue generator matrix of the (24,12,8) Golay code is used:

$G_{24,12,8} =$ $$\begin{smallmatrix}
1 & 0 & 0 & 0 & 0 & 0 & 0 & 0 & 0 & 0 & 0 & 0 & 1 & 1 & 0 & 1 & 1 & 1 & 1 & 0 & 1 & 0 & 0 & 0 \\
0 & 1 & 0 & 0 & 0 & 0 & 0 & 0 & 0 & 0 & 0 & 0 & 1 & 1 & 0 & 1 & 1 & 1 & 1 & 0 & 1 & 0 & 0 \\
0 & 0 & 1 & 0 & 0 & 0 & 0 & 0 & 0 & 0 & 0 & 0 & 0 & 1 & 1 & 0 & 1 & 1 & 1 & 1 & 0 & 1 & 0 \\
0 & 0 & 0 & 1 & 0 & 0 & 0 & 0 & 0 & 0 & 0 & 0 & 0 & 0 & 1 & 1 & 0 & 1 & 1 & 1 & 1 & 0 & 1 \\
0 & 0 & 0 & 0 & 1 & 0 & 0 & 0 & 0 & 0 & 0 & 1 & 0 & 0 & 0 & 1 & 1 & 0 & 1 & 1 & 1 & 1 & 0 \\
0 & 0 & 0 & 0 & 0 & 1 & 0 & 0 & 0 & 0 & 0 & 0 & 1 & 0 & 0 & 0 & 1 & 1 & 0 & 1 & 1 & 1 & 1 \\
0 & 0 & 0 & 0 & 0 & 0 & 1 & 0 & 0 & 0 & 0 & 0 & 1 & 0 & 1 & 0 & 0 & 0 & 1 & 1 & 0 & 1 & 1 & 1 \\
0 & 0 & 0 & 0 & 0 & 0 & 0 & 1 & 0 & 0 & 0 & 0 & 1 & 1 & 0 & 1 & 0 & 0 & 0 & 1 & 1 & 0 & 1 & 1 \\
0 & 0 & 0 & 0 & 0 & 0 & 0 & 0 & 1 & 0 & 0 & 0 & 1 & 1 & 1 & 0 & 1 & 0 & 0 & 0 & 1 & 1 & 0 & 1 \\
0 & 0 & 0 & 0 & 0 & 0 & 0 & 0 & 0 & 1 & 0 & 0 & 1 & 1 & 1 & 1 & 0 & 1 & 0 & 0 & 0 & 1 & 1 & 0 \\
0 & 0 & 0 & 0 & 0 & 0 & 0 & 0 & 0 & 0 & 1 & 0 & 0 & 1 & 1 & 1 & 1 & 0 & 1 & 0 & 0 & 0 & 1 & 1 \\
0 & 0 & 0 & 0 & 0 & 0 & 0 & 0 & 0 & 0 & 0 & 1 & 1 & 0 & 1 & 1 & 1 & 1 & 0 & 1 & 0 & 0 & 0 & 1
\end{smallmatrix}$$

This code can be shortened to obtain a (22,10,8) code by removing eleventh and twelfth columns and rows of $G_{24,10,8}$:

$G_{22,10,8} =$ $$\begin{smallmatrix}
1 & 0 & 0 & 0 & 0 & 0 & 0 & 0 & 0 & 0 & 1 & 1 & 0 & 1 & 1 & 1 & 1 & 0 & 1 & 0 & 0 & 0 \\
0 & 1 & 0 & 0 & 0 & 0 & 0 & 0 & 0 & 0 & 1 & 1 & 0 & 1 & 1 & 1 & 1 & 0 & 1 & 0 & 0 \\
0 & 0 & 1 & 0 & 0 & 0 & 0 & 0 & 0 & 0 & 0 & 1 & 1 & 0 & 1 & 1 & 1 & 1 & 0 & 1 & 0 \\
0 & 0 & 0 & 1 & 0 & 0 & 0 & 0 & 0 & 0 & 0 & 0 & 1 & 1 & 0 & 1 & 1 & 1 & 1 & 0 & 1 \\
0 & 0 & 0 & 0 & 1 & 0 & 0 & 0 & 0 & 1 & 0 & 0 & 0 & 1 & 1 & 0 & 1 & 1 & 1 & 1 & 0 \\
0 & 0 & 0 & 0 & 0 & 1 & 0 & 0 & 0 & 0 & 1 & 0 & 0 & 0 & 1 & 1 & 0 & 1 & 1 & 1 & 1 \\
0 & 0 & 0 & 0 & 0 & 0 & 1 & 0 & 0 & 1 & 0 & 1 & 0 & 0 & 0 & 1 & 1 & 0 & 1 & 1 & 1 \\
0 & 0 & 0 & 0 & 0 & 0 & 0 & 1 & 0 & 0 & 1 & 1 & 0 & 1 & 0 & 0 & 0 & 1 & 1 & 0 & 1 & 1 \\
0 & 0 & 0 & 0 & 0 & 0 & 0 & 0 & 1 & 0 & 1 & 1 & 1 & 0 & 1 & 0 & 0 & 0 & 1 & 1 & 0 & 1 \\
0 & 0 & 0 & 0 & 0 & 0 & 0 & 0 & 0 & 1 & 1 & 1 & 1 & 0 & 1 & 0 & 0 & 0 & 1 & 1 & 0
\end{smallmatrix}$$

A (20,10,6) code can then be obtained by puncturing any two out of the last 12 columns to reduce the code length to 20. By puncturing the last two columns, an optimal code is obtained:

$G_{20,10,6} =$ $$\begin{smallmatrix}
1 & 0 & 0 & 0 & 0 & 0 & 0 & 0 & 0 & 0 & 1 & 1 & 0 & 1 & 1 & 1 & 1 & 0 & 1 & 0 \\
0 & 1 & 0 & 0 & 0 & 0 & 0 & 0 & 0 & 0 & 1 & 1 & 0 & 1 & 1 & 1 & 1 & 0 & 1 \\
0 & 0 & 1 & 0 & 0 & 0 & 0 & 0 & 0 & 0 & 0 & 1 & 1 & 0 & 1 & 1 & 1 & 1 & 0 \\
0 & 0 & 0 & 1 & 0 & 0 & 0 & 0 & 0 & 0 & 0 & 0 & 1 & 1 & 0 & 1 & 1 & 1 & 1 \\
0 & 0 & 0 & 0 & 1 & 0 & 0 & 0 & 0 & 1 & 0 & 0 & 0 & 1 & 1 & 0 & 1 & 1 & 1 \\
0 & 0 & 0 & 0 & 0 & 1 & 0 & 0 & 0 & 0 & 1 & 0 & 0 & 0 & 1 & 1 & 0 & 1 & 1 \\
0 & 0 & 0 & 0 & 0 & 0 & 1 & 0 & 0 & 1 & 0 & 1 & 0 & 0 & 0 & 1 & 1 & 0 & 1 \\
0 & 0 & 0 & 0 & 0 & 0 & 0 & 1 & 0 & 0 & 1 & 1 & 0 & 1 & 0 & 0 & 0 & 1 & 1 & 0 \\
0 & 0 & 0 & 0 & 0 & 0 & 0 & 0 & 1 & 0 & 1 & 1 & 1 & 0 & 1 & 0 & 0 & 0 & 1 & 1 \\
0 & 0 & 0 & 0 & 0 & 0 & 0 & 0 & 0 & 1 & 1 & 1 & 1 & 0 & 1 & 0 & 0 & 0 & 1
\end{smallmatrix}$$

The distance spectrum is given by
0 1
6 40
7 160
8 130
10 176
11 320
12 120
14 40
15 32
16 5

This means that among all the codewords, there is one codeword (the all-zero codeword itself) having zero Hamming distance from the all-zero codeword, there are 40 codewords having Hamming distance 6 from the all-zero codeword, there are 160 codewords having Hamming distance 7 from the all-zero codeword, there are 130 codewords having Hamming distance 8 from the all-zero codeword, there are 176 codewords having Hamming distance 10 from the all-zero codeword, there are 320 codewords having Hamming distance 11 from the all-zero codeword, there are 120 codewords having Hamming distance 12 from the all-zero codeword, there are 40 codewords having Hamming distance 14 from the all-zero codeword, there are 32 codewords having Hamming distance 15 from the all-zero codeword, and there is 1 codeword having Hamming distance 16 from the all-zero codeword. As discussed earlier, any (20, 10,6) code having the distance spectrum as specified above is isomorphic to the code generated by the Generator matrix $G_{20,10,6}$ above.

Figure 5:
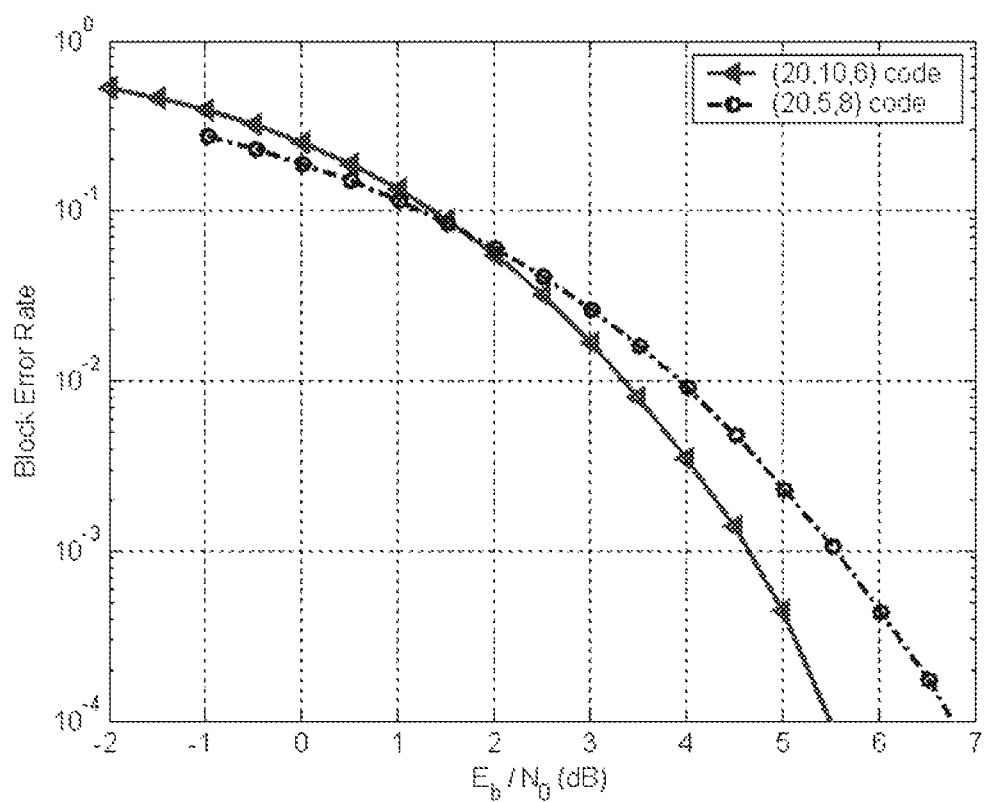
FIG. 5 depicts a graph comparing performance of the Rel6 CQI channel code and a new code having a Hamming distance of 6.
Figure 3:
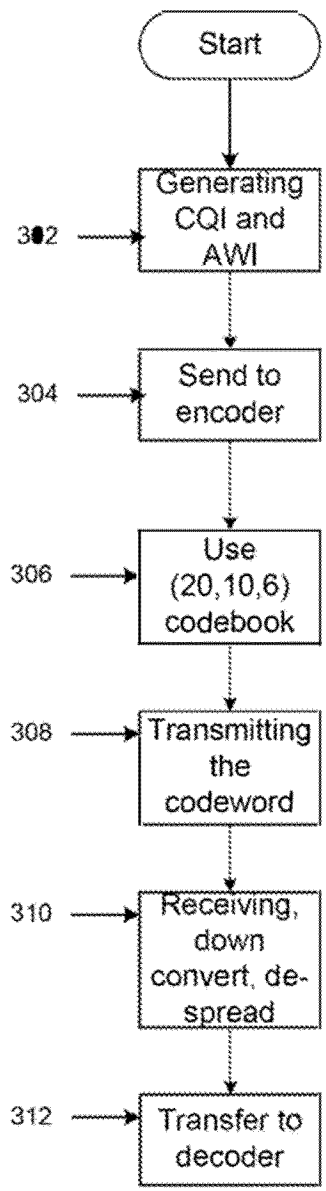

A comparison of the Rel6 CQI channel code and the present optimal code based on the Generator matrix $G_{20,10,6}$ is shown in FIG. 5. It can be seen that with the new channel code, less power per information bit is required to carry the CQI information bits. Overall gain is more than 1.6 dB for the same 1% block error rate target. Recall the previously proposed (20,10,4) code is 1 dB worse than the Release 6 code. Thus, the (20,10,6) code is much better compared to the (20,10,4) code.

Figure 2A:
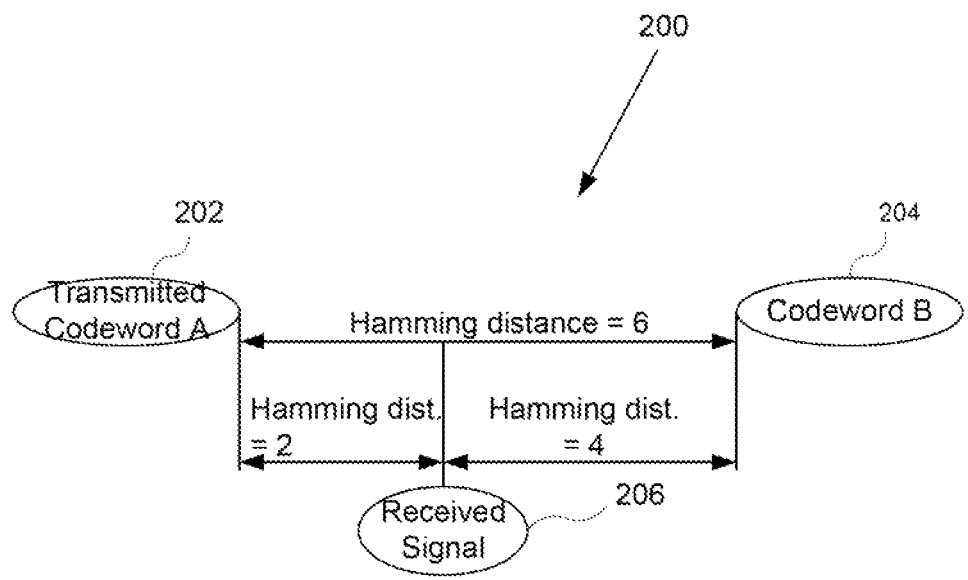
FIG. 2a illustrates an advantage of a codebook with a hamming distance of 6 relative to a codebook with a hamming distance of 4.
Figure 2B:
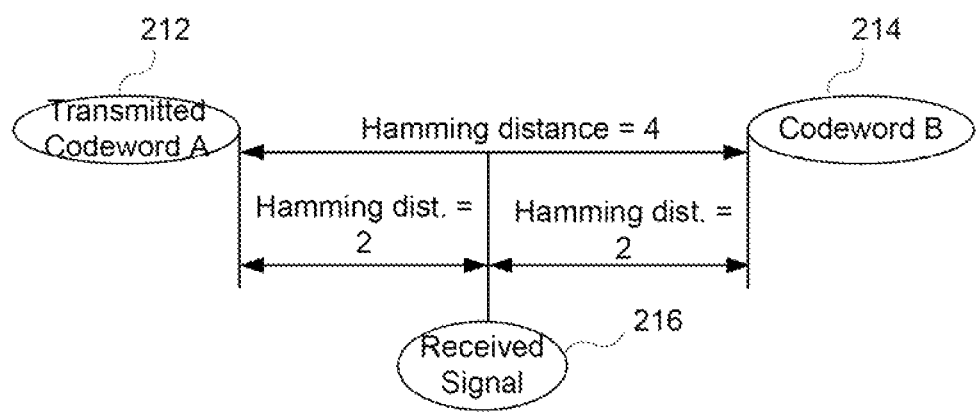
FIG. 2b illustrates a disadvantage of a codebook with a hamming distance of 4 relative to a codebook with a hamming distance of 6.

FIGS. 2a and 2b illustrate the advantage of the optimal code having a minimum Hamming distance 6, instead of 4, in accordance with a preferred embodiment of the present invention. As illustrated in FIG. 2a, due to errors that occur during transmission received signal 206 can be different from transmitted codeword 202. If there are two bits in error in the received signal, the error can be corrected when the minimum Hamming distance is 6. In the case of a minimum Hamming distance of 6, transmitted codeword 202 is still the closest codeword to received signal 206. In contrast, as shown in FIG. 2b, when the minimum Hamming distance is 4, codeword 214 has the same Hamming distance to received signal 216 as originally transmitted codeword 212. In this case, the minimum Hamming distance is 4, the receiver cannot tell which one is the transmitted codeword and thus cannot correct the errors in the received signal.

Figure 3:
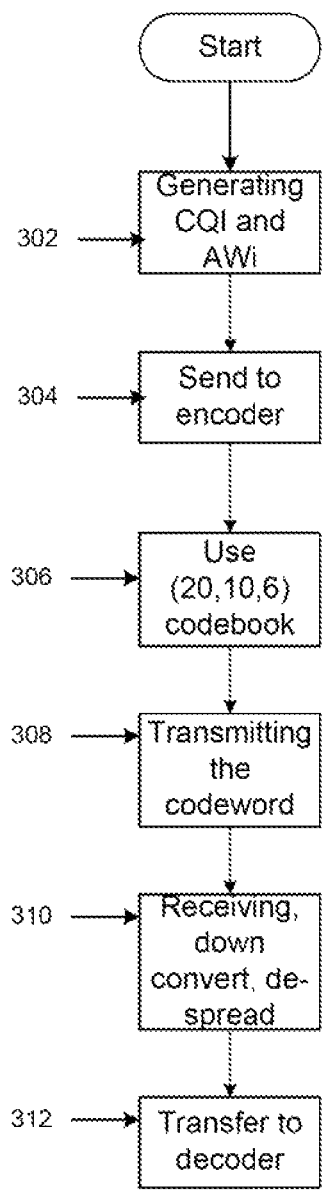
FIG. 3 depicts a process of a user equipment providing CQI and AWI to a base station in accordance with a preferred embodiment of the present invention.
Figure 4:
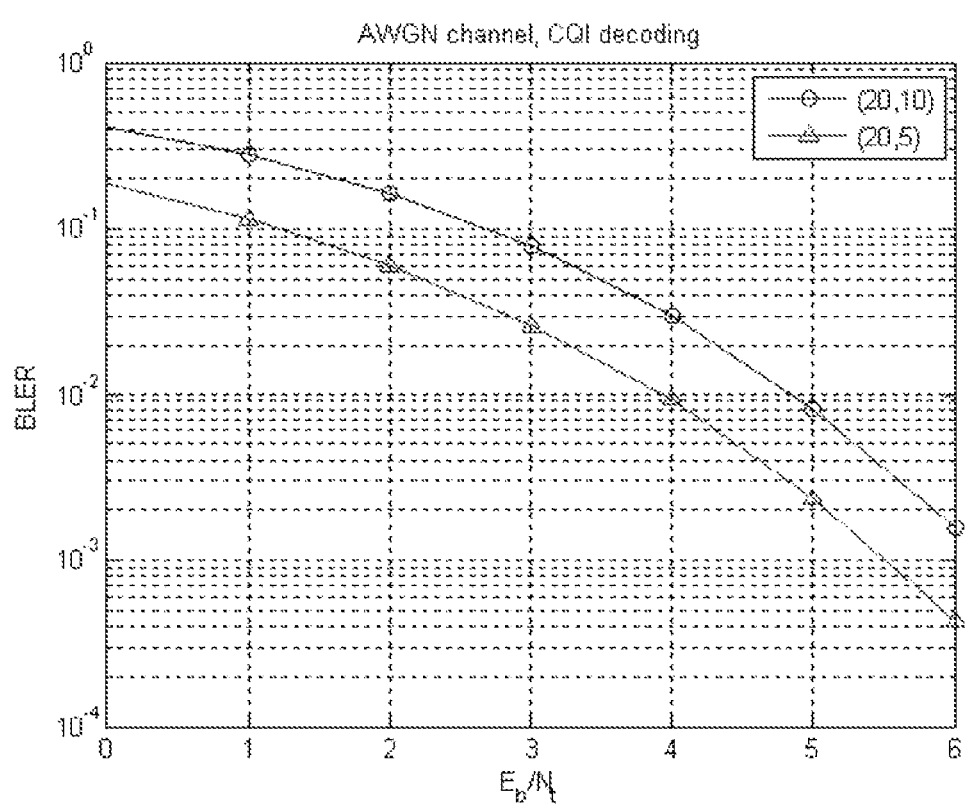
FIG. 4 depicts a graph comparing performance of a Rel6 CQI channel code and a code having a minimum Hamming distance of 4.

FIG. 3 depicts a high-level block diagram of a user equipment (UE) in communication with a base station according to a preferred embodiment of the present invention. The process begins with the UE using a Channel and signal-interference-plus-noise ratio (SINR) estimator to generate CQI and AWI bits (step 302). The 10 bit sequence is transferred to the CQI/AWI encoder (step 304). The encoder utilizes a (20,10,6) codebook to produce a codeword according to the 10-bit sequence (step 306). The (20,10,6) codebook has 1024 codewords, each associated with a 10 bit sequence and the codebook has a property that any two distinct codewords differ by at least 6 bits (Hamming distance of 6). The codeword is transferred from the CQI/AWI encoder to the UE transmitter, which performs spreading, scrambling and RF transmission processing (step 308).

The transmitted codeword is received by the base station receiver and RF down converted, filtered, descrambled and de-spread by a base station receiver, which produces 20 soft values, each corresponding to a bit in the codeword (step 310). The soft values are then transferred to the CQI/AWI decoder to recover the 10 CQI/AWI information bits (312). The decoding process may include the step of correlating the 20 soft values with all the 1024 codewords in the (20,10,6) codebook and then selecting the codeword which has the largest correlation value between the received soft values and the transmitted codeword. The codebook in the CQI/AWI decoder includes the same codebook used by the CQI/AWI encoder in the UE.

Although preferred embodiments of the method and apparatus of the present invention have been illustrated in the accompanying drawings as described in the foregoing detailed description, it will be understood that the invention is not limited to the embodiments disclosed, but is capable of numerous rearrangements, modifications, equivalents and substitutions without departing from the scope of the invention as set forth in the appended claims.

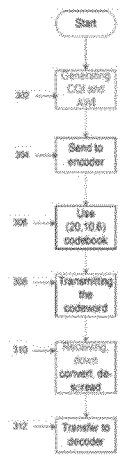

What is claimed:

1. A method in a wireless communication system, comprising the steps of:
generating channel quality indicator (CQI) bits and antenna weight indicator (AWI) bits for transfer to an encoder in a user equipment (UE);
utilizing a (20,10,6) code stored in the UE to produce a codeword according to a ten bit sequence comprising the CQI bits and AWI bits; and
transmitting the codeword to a receiver,
wherein the (20, 10, 6) code refers to a class of codes capable of encoding 10 information bits to produce a codeword 20 bits long that has a Hamming distance of no less than 6 from any other distinct codeword produced by the code.

2. The method of claim 1, further comprising
receiving the codeword, in a signal, at the receiver, wherein the receiver includes a base station receiver;
processing the received signal to produce twenty soft values, each soft value corresponding to a bit in the (20,10,6) codeword; and
decoding the soft values to recover the CQI bits and the AWI bits and passing the CQI bits to a rate controller and the AWI bits to an AWI controller.

3. The method of claim 2, wherein the step of decoding the twenty soft values further comprises the step of correlating the twenty soft values to all codewords in the (20,10, 6) code.

4. The method of claim 2, wherein the step of processing the received signal to produce the soft values further comprises the step of quantizing each soft value to two levels.

5. The method of claim 1, wherein the step of utilizing a (20,10,6) code stored in the UE to produce a codeword further comprises the step of utilizing a (20,10,6) codebook to produce the codeword.

6. The method of claim 1 wherein the step of utilizing a (20,10,6) code stored in the UE to produce a codeword further comprises the step of utilizing a (20,10,6) generator matrix to produce the codeword.

7. The method of claim 5, wherein the (20,10,6) codebook comprises 40 codewords having a Hamming distance 6 from an all-zero codeword.

8. The method of claim 1, the (20,10,6) code referring to a class of codes comprising the following Hamming distances from an all-zero codeword:
one codeword having zero Hamming distance; 40 codewords having Hamming distance 6; 160 codewords having Hamming distance 7; 130 codewords having Hamming distance 8; 176 codewords having Hamming distance 10; 320 codewords having Hamming distance 11; 120 codewords having Hamming distance 12; 40 codewords having Hamming distance 14; 32 codewords having Hamming distance 15; and 1 codeword having Hamming distance 16.

9. A user equipment, in a wideband code division multi access (WCDMA) system for reporting Multiple-Input-Multiple-Output (MIMO) channel quality indicators (CQI) and antenna weight indicators (AWI), the user equipment comprising:
 a processor; and
 a memory containing instructions that, when executed by the processor, cause the user equipment to generate channel quality indicator (CQI) bits and antenna weight indicator (AWI) bits;
 an encoder configured to utilize a (20,10,6) code stored in the user equipment to produce a codeword according to a ten bit sequence comprising the CQI bits and AWI bits; and
 a transmitter configured to transmit the codeword to a receiver,
 wherein the (20, 10, 6) code refers to a class of codes capable of encoding 10 information bits to produce a codeword 20 bits long that has a Hamming distance of no less than 6 from any other distinct codeword produced by the code.

10. The User Equipment of claim 9, the (20,10,6) referring to a class of codes comprising the following Hamming distances from an all-zero codeword:
 one codeword having zero Hamming distance; 40 codewords having Hamming distance 6; 160 codewords having Hamming distance 7; 130 codewords having Hamming distance 8; 176 codewords having Hamming distance 10; 320 codewords having Hamming distance 11; 120 codewords having Hamming distance 12; 40 codewords having Hamming distance 14; 32 codewords having Hamming distance 15; and 1 codeword having Hamming distance 16.

11. The User Equipment of claim 10, wherein the transmitter is further configured to spread, scramble, and perform RF transmission processing.

12. The User Equipment of claim 9 wherein the encoder utilizes a (20,10,6) generator matrix to produce the codeword.

13. The User Equipment of claim 9, wherein the encoder utilizes a (20,10,6) codebook to produce the codeword.

14. A base station in a wideband code division multi access (WCDMA) system, the base station comprising:
 a processor; and
 a memory containing instructions that, when executed by the processor, cause the base station to:
 receive and store Multiple-Input-Multiple-Output (MIMO) channel quality indicator (CQI) bits and antenna weight indicator (AWI) bits, wherein the receipt and storage of the MIMO CQI and AWI bits includes:
 receiving a signal containing a (20,10,6) codeword;
 processing the received signal to produce twenty soft values, each soft value corresponding to a bit in the (20,10,6) codeword; and
 for decoding the twenty soft values to recover the CQI bits and the AWI bits passing the CQI bits to a rate controller and AWI bits to an Antenna Weight controller,
 wherein the (20, 10, 6) code refers to a class of codes capable of encoding 10 information bits to produce a codeword 20 bits long that has a Hamming distance of no less than 6 from any other distinct codeword produced by the code.

15. The base station of claim 14, wherein the decoding includes correlating the twenty soft values to all codewords in the (20,10,6) code.

16. The base station of claim 14, wherein the decoding includes quantizing each soft value to two levels.

17. The base station of claim 14, the (20,10,6) code referring to a class of codes comprising the following Hamming distances from an all-zero codeword:
 one codeword having zero Hamming distance; 40 codewords having Hamming distance 6; 160 codewords having Hamming distance 7; 130 codewords having Hamming distance 8; 176 codewords having Hamming distance 10; 320 codewords having Hamming distance 11; 120 codewords having Hamming distance 12; 40 codewords having Hamming distance 14; 32 codewords having Hamming distance 15; and 1 codeword having Hamming distance 16.

18. A system in a wireless communication system comprising: a User Equipment (UE) comprising: a channel and signal-interference-plus-noise ratio estimator for generating CQI and AWI bits; a CQI/AWI encoder utilizing a (20,10,6) code for producing a codeword according to the generated CQI and AWI bits; and a transmitter for transmitting a signal containing the produced codeword; and a base station comprising: a receiver for receiving the signal containing the produced codeword; a processor for processing the received signal and producing twenty soft values, each of the soft values corresponding to a bit in the codeword; and a CQI/AWI decoder for decoding the soft values to recover the CQI and AWI bits and passing the CQI bits to a Rate controller and the AWI bits to an Antenna weight controller, wherein the (20, 10, 6) code refers to a class of codes capable of encoding 10 information bits to produce a codeword 20 bits long that has a Hamming distance of no less than 6 from any other distinct codeword produced by the code.

19. The system of claim 15, the (20,10,6) code referring to a class of codes comprising the following Hamming distances from an all-zero codeword:
 one codeword having zero Hamming distance; 40 codewords having Hamming distance 6; 160 codewords having Hamming distance 7; 130 codewords having Hamming distance 8; 176 codewords having Hamming distance 10; 320 codewords having Hamming distance 11; 120 codewords having Hamming distance 12; 40 codewords having Hamming distance 14; 32 codewords having Hamming distance 15; and 1 codeword having Hamming distance 16.

20. The system of claim 18, wherein the decoding that the CQI/AWI decoder is configured to perform includes correlating the twenty soft values to all codewords in the (20,10, 6) code.

21. The base station of claim 18, further comprising means for quantizing each soft value to two levels.

22. The system of claim 18 wherein the CQI/AWI encoder utilizes a (20,10,6) generator matrix to produce the codeword.

23. The system of claim 18, wherein the a CQI/AWI encoder utilizes a (20,10,6) codebook to produce the codeword.

* * * * *

UNITED STATES PATENT AND TRADEMARK OFFICE
CERTIFICATE OF CORRECTION

Page 1 of 4

PATENT NO. : 10,218,419 B2
APPLICATION NO. : 13/927975
DATED : February 26, 2019
INVENTOR(S) : Cheng et al.

It is certified that error appears in the above-identified patent and that said Letters Patent is hereby corrected as shown below:

On the Title Page

Delete the title page and substitute therefore with the attached title page consisting of the corrected illustrative figure(s).

Item (56), under "OTHER PUBLICATIONS", in Column 2, Line 2, delete "Natinal" and insert -- National --, therefor.

Item (57), under "ABSTRACT", in Column 2, Lines 7-8, delete "of 6 The" and insert -- of 6. The --, therefor.

On Page 2, Item (56), under "OTHER PUBLICATIONS", in Column 2, Line 3, delete "Coes; Folay" and insert -- Codes; Golay --, therefor.

On Page 2, Item (56), under "OTHER PUBLICATIONS", in Column 2, Line 6, delete "no.. pp." and insert -- pp. --, therefor.

In the Drawings

Please replace FIG. 3 with FIG. 3 as shown on the attached page.

In the Specification

In Column 1, Line 44, delete "(3GGPP" and insert -- (3GPP --, therefor.

In Column 4, Line 28, delete "spectrum" and insert -- spectrum. --, therefor.

In Column 4, Line 31, delete "DRAWING" and insert -- DRAWINGS --, therefor.

In Column 5, Lines 23-24, delete "signal-interference-plus-noise ratio (SINR)" and insert Signed and Sealed this
Twenty-fifth Day of February, 2020

Andrei Iancu
*Director of the United States Patent and Trademark Office*

CERTIFICATE OF CORRECTION (continued)
U.S. Pat. No. 10,218,419 B2

Page 2 of 4

-- signal-to-interference-plus-noise ratio (SINR) --, therefor.

In Column 7, Line 49, delete "signal-interference-plus-noise ratio (SINR)" and insert -- signal-to-interference-plus-noise ratio (SINR) --, therefor.

In the Claims

In Column 9, Lines 1-2, in Claim 9, delete "wideband code division multi access (WCDMA)" and insert -- wideband code division multiple access (WCDMA) --, therefor.

In Column 9, Lines 43-44, in Claim 14, delete "wideband code division multi access (WCDMA)" and insert -- wideband code division multiple access (WCDMA) --, therefor.

In Column 9, Line 57, in Claim 14, delete "for decoding" and insert -- decoding --, therefor.

In Column 10, Line 59, in Claim 23, delete "the a CQI/AWI" and insert -- the CQI/AWI --, therefor.

(12) United States Patent
Cheng et al.

(10) Patent No.: US 10,218,419 B2
(45) Date of Patent: *Feb. 26, 2019

(54) SYSTEM AND METHOD FOR CODING WCDMA MIMO CQI REPORTS

(71) Applicant: TELEFONAKTIEBOLAGET L M ERICSSON (PUBL), Stockholm (SE)

(72) Inventors: Jung-Fu Cheng, Cary, NC (US); Yi-Pin Eric Wang, Cary, NC (US); Stephen Grant, Cary, NC (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1048 days.

This patent is subject to a terminal disclaimer.

(21) Appl. No.: 13/927,975

(22) Filed: Jun. 26, 2013

(65) Prior Publication Data
US 2014/0126663 A1 May 8, 2014

Related U.S. Application Data

(63) Continuation of application No. 11/862,601, filed on Sep. 27, 2007, now Pat. No. 8,619,742.

(60) Provisional application No. 60/863,688, filed on Oct. 31, 2006.

(51) Int. Cl.
| | |
|---|---|
| H04B 7/0456 | (2017.01) |
| H04B 1/707 | (2011.01) |
| H04L 1/00 | (2006.01) |
| H04L 1/06 | (2006.01) |
| H04L 25/02 | (2006.01) |

(52) U.S. Cl.
CPC ........ *H04B 7/0473* (2013.01); *H04B 1/707* (2013.01); *H04L 1/0026* (2013.01); *H04L 1/0031* (2013.01); *H04L 1/0057* (2013.01); *H04L 1/0073* (2013.01); *H04L 1/06* (2013.01); *H04L 25/0202* (2013.01)

(58) Field of Classification Search
CPC ..... H04B 1/707; H04B 7/0473; H04L 1/0026; H04L 1/0031; H04L 1/0057; H04L 1/0073; H04L 1/06; H04L 25/0202
USPC .................................................. 370/208–356
See application file for complete search history.

(56) References Cited

U.S. PATENT DOCUMENTS

| | | |
|---|---|---|
| 3,353,155 A | 11/1967 | Chien et al. |
| 5,150,381 A | 9/1992 | Forney et al. |
| 5,761,239 A * | 6/1998 | Gold et al. .............. 375/150 |
| 5,890,151 A | 3/1999 | Agrawal et al. |
| 5,996,104 A | 11/1999 | Herzberg |
| 6,038,315 A | 3/2000 | Strait et al. |

(Continued)

OTHER PUBLICATIONS

Kenneth et al., Construction of Binary Linear Codes, 2000, Department of Mathematics, Natinal University of Singapore, pp. 1-53.*

(Continued)

*Primary Examiner* — Nicholas Sloms

(57) ABSTRACT

A block coding method and system for improving the reliability of Channel Quality Indicators (CQI) and antenna weight indicators (AWI) reporting. A user terminal first generates 8-bit CQI and 2-bit AWI. A codeword generator produces a codeword responsive to these 10 CQI/AWI bits using a codebook or a generator matrix of a (20,10,6) code. The (20,10,6) code has a minimum Hamming distance of 6 The encoded codeword is transmitted to a receiver for decoding utilizing an identical (20,10,6) codebook.

23 Claims, 5 Drawing Sheets